United States Patent [19]

Ejzak et al.

[11] 4,403,292
[45] Sep. 6, 1983

[54] CONTROL FOR AN ELECTRICAL GENERATING AND DISTRIBUTION SYSTEM, AND METHOD OF OPERATION

[75] Inventors: Richard P. Ejzak, Rockford; James B. Thom, Rock City; William J. Peterson; Timothy F. Glennon, both of Rockford, all of Ill.

[73] Assignee: Sundstrand Corporation, Rockford, Ill.

[21] Appl. No.: 189,776

[22] Filed: Sep. 22, 1980

Related U.S. Application Data

[63] Continuation of Ser. No. 43,804, May 30, 1979, abandoned.

[51] Int. Cl.³ .................. G05B 15/02; G06F 15/56
[52] U.S. Cl. .................. 364/492; 307/19; 307/29; 307/71
[58] Field of Search .................. 364/492, 493; 307/18, 307/19, 23, 29, 65, 70, 71, 85; 322/28

[56] References Cited

U.S. PATENT DOCUMENTS

| | | | |
|---|---|---|---|
| 3,519,843 | 7/1970 | Trautman | 307/65 |
| 3,842,249 | 10/1974 | Geyer et al. | 364/492 |
| 3,984,755 | 10/1976 | Lehnhoff et al. | 322/28 |
| 3,996,507 | 12/1976 | Chambers | 322/28 X |
| 4,096,394 | 6/1978 | Ullmann et al. | 307/65 X |
| 4,161,027 | 7/1979 | Russell | 364/492 |

OTHER PUBLICATIONS

Geyer et al.: Automatic Control of Aircraft Electrical System Reduces Wiring and Improves Reliability, Westinghouse Eng., Jul. 1971.
Dickey et al.: Solid State Switching for Aircraft Electric Systems, IEEE Spectrum, Nov. 1970, pp. 73-79.
Eckenfelder: Airborne Display and Electric Management System, Hescou Proceedings, Aug. 1970, 17/4, pp. 1-5.

Primary Examiner—Felix D. Gruber
Attorney, Agent, or Firm—Wood, Dalton, Phillips, Mason & Rowe

[57] ABSTRACT

A control for an electrical generating and distribution system utilizing a plurality of interconnected microprocessors. An electrical system, for an aircraft for example, may have two engine driven generators and an auxiliary power unit generator with loads connected to each of the engine driven generators through generator circuit breakers. An electrical distribution bus connected through bus tie breakers interconnects the load circuits and the auxiliary generator so that any one generator can power either or both loads. Each generator has a microprocessor generator control unit responsive to the associated generator conditions to control generator operation. A microprocessor bus power control unit is responsive to distribution circuit conditions and correlates information from the generator control units, contributing to operation of the bus tie breakers, controlling distribution of power from the generators to the loads. Serial data links between the bus power control unit and each of the generator control units provide for communication of input and control information and enable comparison of redundant circuit information enhancing reliability of the system operation. A generator voltage regulator utilizes the microprocessor of the generator control unit to develop an error voltage which is added to the average phase voltage of the generator, controlling the generator field current. In the event of a phase failure the generator control unit senses an abnormally high phase voltage condition, disables the average phase voltage circuit and the regulator continues to operate with the error voltage.

9 Claims, 8 Drawing Figures

CONTROL FOR AN ELECTRICAL GENERATING AND DISTRIBUTION SYSTEM, AND METHOD OF OPERATION

This is a continuation of application Ser. No. 43,804 filed May 30, 1979, now abandoned.

This application relates to a control for an electrical generation and distribution system and to a method for operating the control.

BACKGROUND OF THE INVENTION

In a typical multi-engine aircraft electrical system for which the invention is particularly suited, each engine drives a generator through a constant speed drive. Each of the engine driven generators powers a set of load circuits and the load circuits may be interconnected through an electrical distribution bus. An auxiliary power unit drives an auxiliary generator to supplement the engine driven generators in the event of an engine or generator failure. The auxiliary power unit is also used to provide electric power with the aircraft on the ground when the engine are shut down and an external power source is not readily available.

A generator control unit (GCU) for each of the generators monitors the electrical condition of the associated generator and conditions of the mechanical drive to the generator. A bus power control unit (BPCU) monitors power distribution throughout the system and the condition of the generators, and controls bus tie breakers which connect the electrical distribution bus between the generators, loads and the auxiliary generator. One or both loads are powered by one of the available generators. Two generators are not, however, connected in parallel. The control units have in the past coordinated interlock information using multiple hard wired circuits.

In accordance with the invention, the generator control units and the bus power control unit utilize integrated circuit microprocessors which have several advantages including functional flexibility and improved reliability.

Interconnection is provided between the bus power control unit and each of the generator control units through serial data links. Input and output information may be shared by the BPCU and each of the GCU's, minimizing the interconnecting wiring required between the control units, the generators and the sensors and circuit breakers for the electrical distribution system.

Redundant informaion concerning generator and distribution circuit conditions may readily be collected and compared without the addition of hardware and wiring.

The microprocessor control units enable the utilization of multiple time delays in the control program. The time delays are based on the microprocessor clock frequency and have an inherent accuracy much higher than that of a discrete component timer. Accordingly, time limits for the operation of related circuits may be shortened as it is not necessary to accommodate the large time tolerances of discrete component timers. Moreover, additional weight and component space is not required for each timer and more and different time delays may be utilized where desirable.

Many of the control functions are based on software programing of the microprocessors. Changes may readily be made to accommodate different system requirements.

Another feature of the invention is the provision of a method of controlling the system in which each of the GCU's is operated in accordance with conditions of the associated generator and the BPCU is operated in accordance with electrical distribution circuit conditions and together they control the circuit and tie breakers.

Yet a further feature is the provision of a voltage regulator in which an average of the generator phase voltages is corrected by an error signal to control the generator field current source and having means for sensing an abnormally high phase voltage to disable the summing means and operate the field current source from the error signal.

Further features and advantages of the invention will readily be apparent from the following specification and from the drawings, in which:

The electrical generation and distribution system and method are illustrated and described herein as embodied in a system for a top engine aircraft with an auxiliary power unit. It will be understood that features of the control may be utilized with other aircraft electrical generation and distribution systems and with electrical generation and distribution systems of other kinds.

Figure 1:
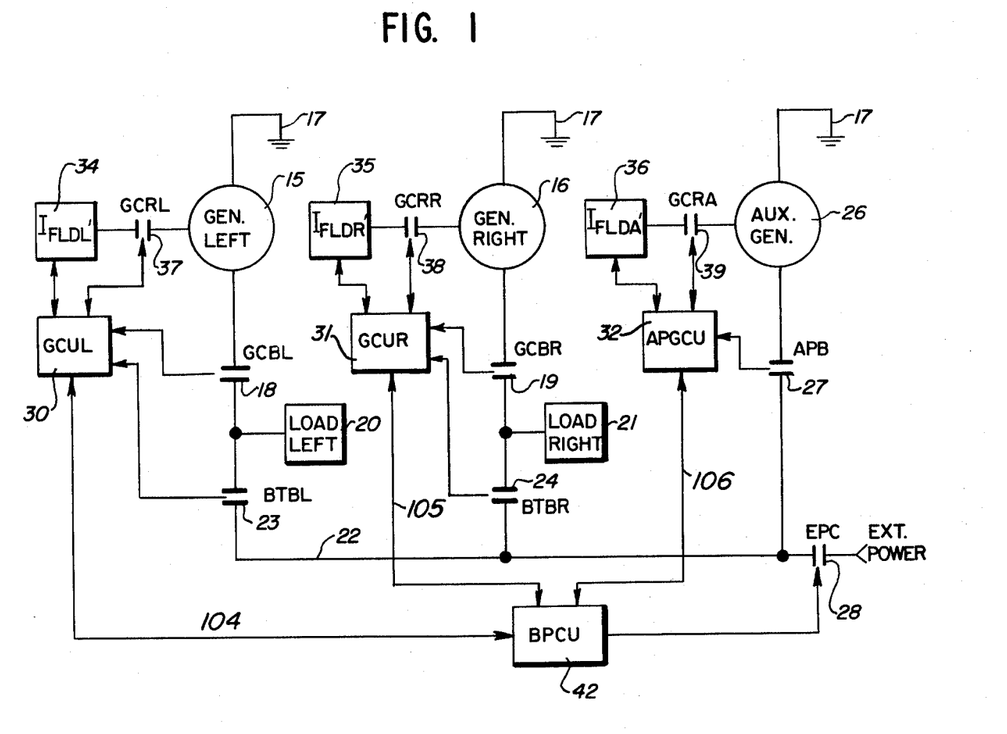
FIG. 1 is a simplified system schematic.

The simplified system illustrated in FIG. 1 utilizes a single line to indicate what may be multiple connections between elements. A pair of engine driven generators 15, 16 are designated GEN LEFT and GEN RIGHT. Both generators have outputs referenced to a common return or ground 17 and connected through output circuits including generator circuit breakers 18, 19, designated GCBL and GCBR, with loads 20, 21 respectively. An electrical distribution bus 22 may be selectively connected with the generator output circuits loads 20, 21 through bus tie breakers 23, 24 designated BTBL and BTBR.

An auxiliary generator 26 also has an output referenced to ground 17 and connected through an output circuit including auxiliary power breaker 27 (APB) with electrical distribution bus 22. Further details of an auxiliary power unit which includes the auxiliary power generator may be found in Glennon et al application Ser. No. 18,739, filed Mar. 8, 1979, and assigned to the assignee of this invention.

An external power source (not shown) may be connected with the electrical system when the aircraft is on the ground through a contactor 28, designated EPC.

The aircraft electrical system is typically a three phase system operating at 400 Hertz with a four wire distribution system. Accordingly, the single line connections and single contactors described above represent four conductors and three pole relays, the neutral remaining unbroken.

Each of the generators has a control unit 30, 31 and 32. The generator control unit is designated GCU with that for the left generator being GCUL, that for the right generator being GCUR, and that of the auxiliary generator being APGCU. As will appear in more detail below, generator control units 30, 31 and 32 monitor the operating conditions of the associated generators and control the operation of field current sources 34, 35 and 36 and generator control relays 37, 38 and 39, respectively. The field current sources are designated $I_{FLD}$ and the generator control relays are designated GCR. The field current source and generator control relay may physically be a part of the control unit.

The arrowheads at each end of the lines interconnecting the GCU with the associated $I_{FLD}$ and GCR indicate that information for status and control is transmitted in both directions. The single headed line between the generator circuit and bus tie breakers (as 18, 27) and the GCU (as 30) indicate that breaker status or condition information is an input to the GCU. A similar drawing convention is followed in other figures.

A bus power control unit 42 (BPCU) is connected for transmission of system condition information and interlocks with each GCU, and, as will appear in more detail below, controls the operation of the breakers BTB to maintain optimal distribution of energy from the sources available to loads 20, 21. In accordance with the invention, each of the control units utilizes a microprocessor to provide for the collection and organization of information concerning generator operation and circuit conditions and for the establishment and distribution of appropriate control signals.

Figure 2:
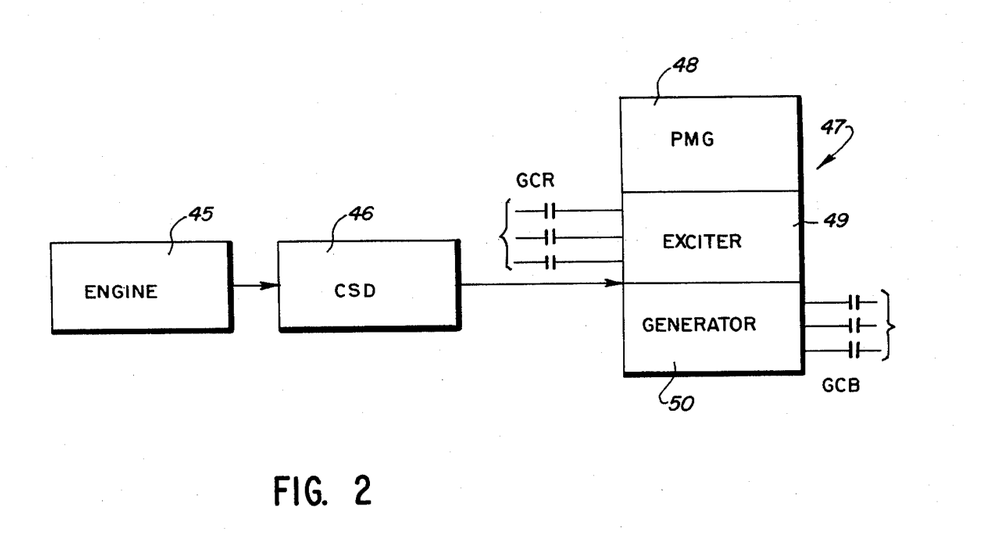
FIG. 2 is a block diagram of an engine driven generator utilized in the system.

As a further illustration of a typical aircraft electrical system, FIG. 2 shows in block form an engine 45 which powers a constant speed drive 46 that supplies rotary input to the generator 47 including a permanent magnet generator (PMG) 48, an exciter generator 49 and the three phase power generator 50. The drive may be integrated with the generator in a single housing (IDM). Briefly, the rotors of each of the PMG, exciter and power generators are mounted on a common shaft driven by the constant speed drive 46. The PMG has an output that supplies power for the control units and for exciter 49. Exciter 49 has a fixed field and rotating armature with the armature output being rectified and connected with the rotating field of power generator 50 which in turn has an output derived from fixed windings. Field current for exciter 49 is provided from the PMG through the contacts of generator control relay GCR and a voltage regulator. The output of generator 50 is connected with the load circuit through the three contacts of generator circuit breaker GCB.

Figure 3:
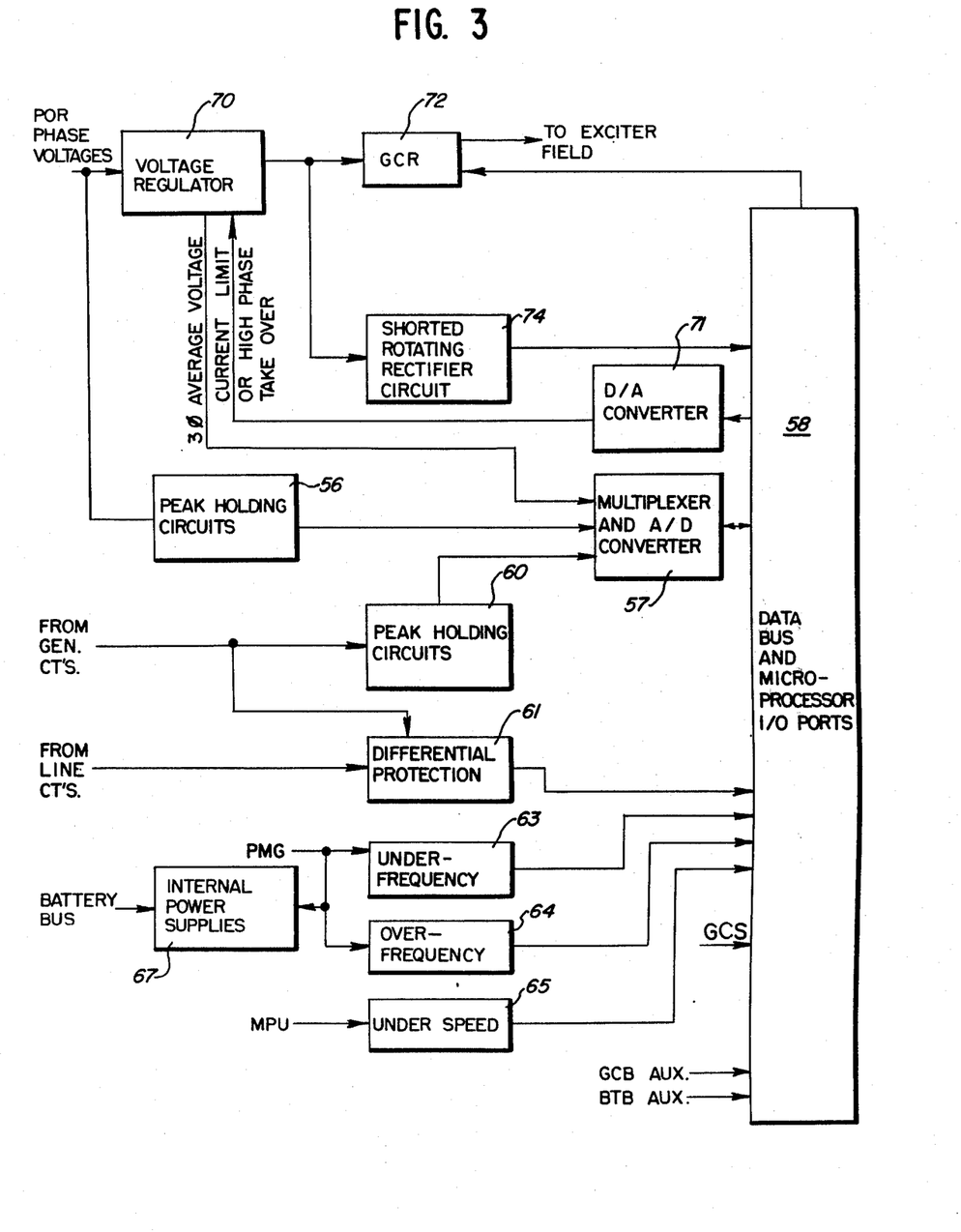
FIG. 3 is a simplified block diagram of a portion cf the generator control unit.

FIG. 3 illustrates in simplified block form the principal generator and distribution system inputs to the generator circuit unit GCU. The microcomputer may be an Intel Corporation type 8085 microprocessor. The generator output voltage for each of the three phases is derived at a point of regulation (POR), which may be a terminal of the generator circuit breaker GCB. The phase voltages are connected through peak holding circuits 56 to an analog signal multiplexer and analog to digital converter 57. The phase voltages, along with other inputs to be described, are selected sequentially by the multiplexer, converted to digital information and coupled to the microprocessor through the data bus and input-output (I/O) ports 58.

Phase currents are sensed by current transformers CT'S (not shown in FIG. 3) and coupled through peak holding circuits 60 to the multiplexer and A/D converter 57. Distribution circuit line currents are also sensed by current transformers and connected along with the generator current signals to a differential current comparator 61 which provides an appropriate input to the microprocessor in the event an excessive current unbalance occurs.

The output of the permanent magnet generator PMG is sensed with under and over frequency detectors 63, 64 which, if the frequency is outside selected limits, provide signals to the microprocessor. Alternatively, the PMG output may be converted to a digital signal and connected directly with the microprocessor. A magnetic pickup unit MPU associated with the constant speed drive 46 provides a signal to underspeed detector circuit 65 which also provides an information input to the microprocessor. Other generator condition signals are provided from a generator control switch GCS, a cockpit control enabling operation of the generator control relay when the engine is started, and from auxiliary contacts of the generator circuit breaker GCB and bus tie breaker BTB.

The output of the permanent magnet generator PMG is also utilized for the GCU internal power supplies 67. The power supplies are energized from the aircraft battery bus when a generator is not operating.

The generator phase voltages from the point of regulation are connected with voltage regulator 70 in which, as will appear in more detail below, a three phase average voltage is derived and coupled through multiplexer and A/D converter 57 to the microprocessor. A voltage error signal developed by the microprocessor is coupled out through digital to analog (D/A) converter 71 to the voltage regulator. A regulated field current for the exciter is connected through the generator control relay 72 to the field winding of exciter 49. A low voltage monitor 73 (FIG. 5) and a rotating rectifier short circuit detector 74 connected with the field circuit provide additional inputs to the microprocessor.

Figure 4:
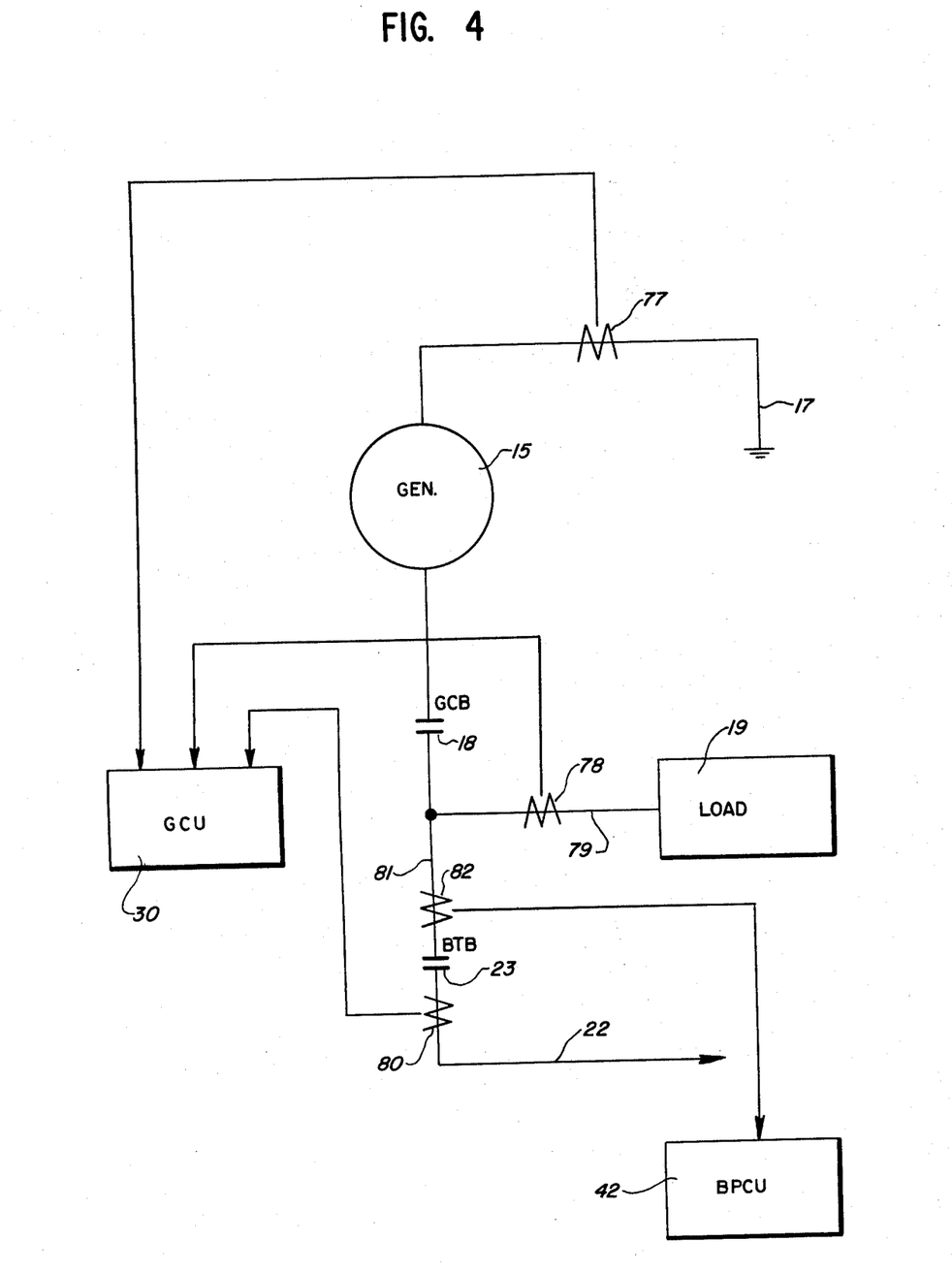
FIG. 4 is a partial schematic drawing showing system current sensors connected with the generator control unit and the bus power control unit.

The phase currents at various points in the system are sensed, as by current transformers, and coupled to the generator control units and the bus power control unit. These generator and system condition inputs to the control units afford a basis for control functions and provide redundant information used in checking system operation. FIG. 4 illustrates the location of current transformers providing generator and system condition information to the generator control unit 30 and bus power control unit 42. The reference numerals used are those associated with the left generator and similar sensors are used with the other generators. The currents from the generator are measured by generator current transformer 77 connected between the generator and ground reference 17. Load current is measured by current transformer 78 in the load feeder 79. These current inputs are all connected with generator control unit 30. Currents in the tie bus 22 are sensed at the connection with bus tie breaker 23 by current transformer 80. Current flowing in the feeder 81 between bus tie breaker 23 and the connection with the load feeder 79 is sensed by current transformer 82 connected with the bus power control unit 42.

Figure 5:
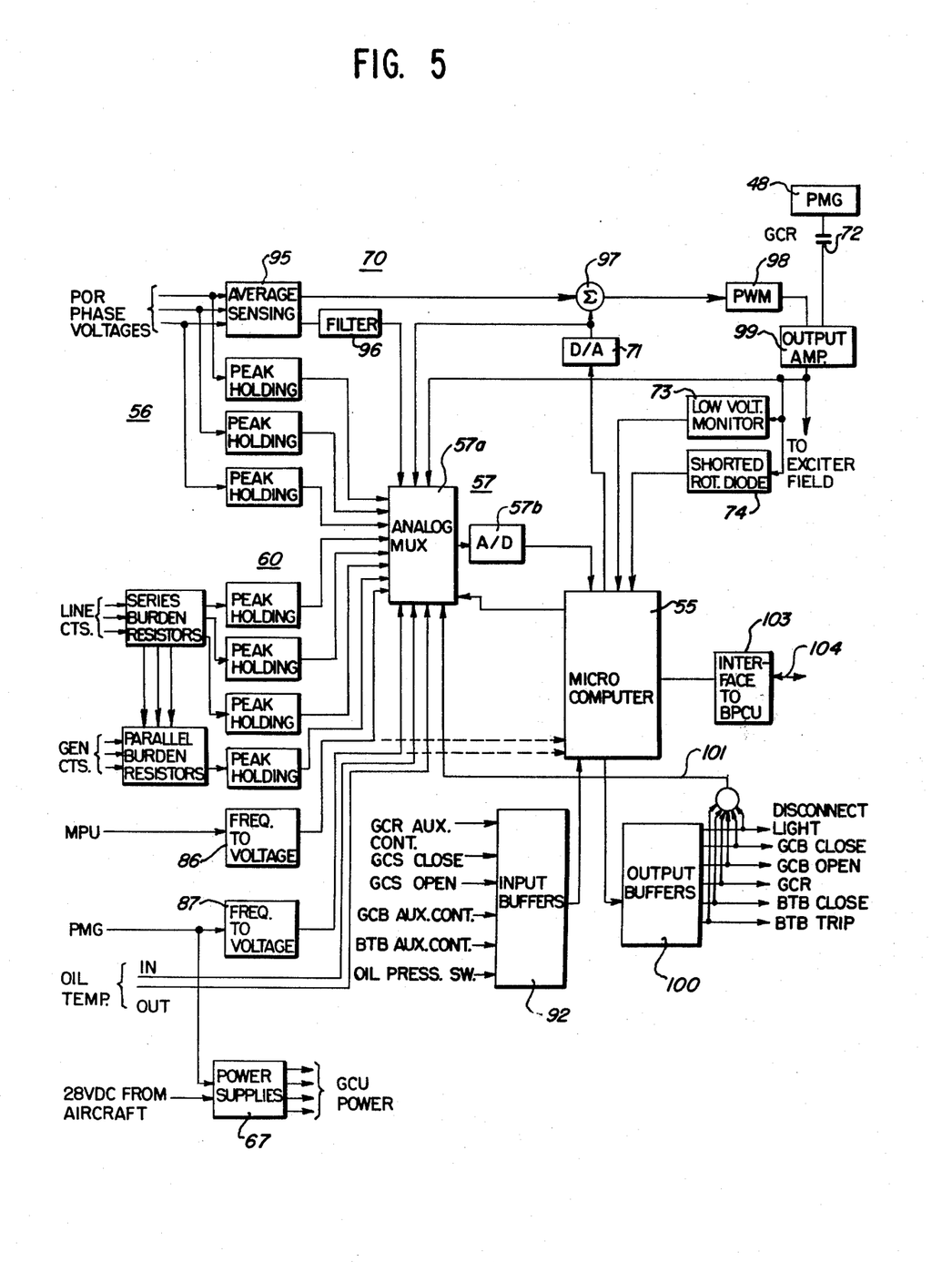
FIG. 5 is a block diagram similar to FIG. 3 with additional detail.

FIG. 5 shows in somewhat more detail the inputs to and the outputs of the generator control unit. To the extent that it is practical, reference numerals from FIG. 3 are used in FIG. 5. The various analog signals representing generator conditions are coupled through analog Multiplexer 57a and A/D converter 57b to microcomputer 55. These include the point of regulation phase voltages sensed by peak holding circuits 56 and the line and generator currents from the respective current transformers sensed by peak holding circuits 60. A speed signal for the constant speed drive 46 from the magnetic pickup is connected through a frequency to voltage converter 86. Similarly the speed signal from the permanent magnet generator 48 is connected through a frequency to voltage converter 87. The temperature of oil used in the constant speed drive and for cooling the generator is sensed at both the inlet and outlet of the IDG housing. Analog temperature signals provide additional multiplexer inputs. Under control of the microcomputer, analog multiplexer 57a sequentially scans the generator condition inputs and the signals are connected through analog to digital converter 57b to an input of the microcomputer. The MPU and PMG speed signals may be converted directly to digital form and coupled to microcomputer 55 as indicated in broken lines.

Digital inputs, e.g., switches, are connected through input buffers 92 to microcomputer 55. These inputs include auxiliary contacts on the generator control relay GCR, generator circuit breaker GCB and bus tie breaker BTB. Generator control switch GCS, a cockpit control, provides discrete input signals in both the closed or the open position. An oil pressure switch provides a further input indicating the availability of oil to operate the constant speed drive and to cool the generator.

With particular reference to the voltage regulator portion of the control unit indicated generally at 70, the average phase voltage of the generator is developed in average sensing circuit 95, and connected through filter 96 with the analog multiplexer. The error signal described in connection with FIG. 3 is connected through digital to analog converter 71 to summing junction 97 where it is added to the average phase voltage and the sum connected with a pulse width modulator (PWM) 98 that drives output amplifier 99 providing field current to the exciter field winding. The field circuit power is supplied by the permanent magnet generator through the generator control relay 72. The outputs of digital to analog converter 71 and of output amplifier 99 are connected with inputs of the analog multiplexer 57a and are compared by microprocessor 55 with the desired quantities as a check on the operation of the system. Shorted rotating diode circuit 74 senses a diode failure and provides an input to the microprocessor to operate the generator control relay 72.

Outputs from microcomputer 55 are connected through output buffers 100. The principal outputs include signals controlling operation of generator control relay GCR and closing or opening the breaker GCB and BTB. A disconnect light output provides a visual indication in the cockpit that a condition exists in which the generator should be disconnected. As an additional check on system operation, the output buffer signals are connected through a multi-conductor connection 101 with analog signal input multiplexer 57a.

Communication between the microcomputer 55 and the bus power control unit is provided through an interface 103 and a serial data link 104 which may comprise a two wire twisted pair. As data is communicated between the control units in a serial fashion, only a two wire line is needed even though the data may represent many different circuit conditions or control signals. In the three generator system illustrated, the bus power control unit may have a four millisecond cycle period. During each cycle system information is exchanged and verified by communication over the data link.

An internal clock (not shown) provides timing for the microprocessor, the multiplexer and demultiplexer and other timer circuits. Synchronizing signals transmitted over the data bus 104 from the bus power control unit coordinate operation of the system control units. The clock signals are counted to establish accurate timing periods which may have a common reference or starting time.

Figure 6:
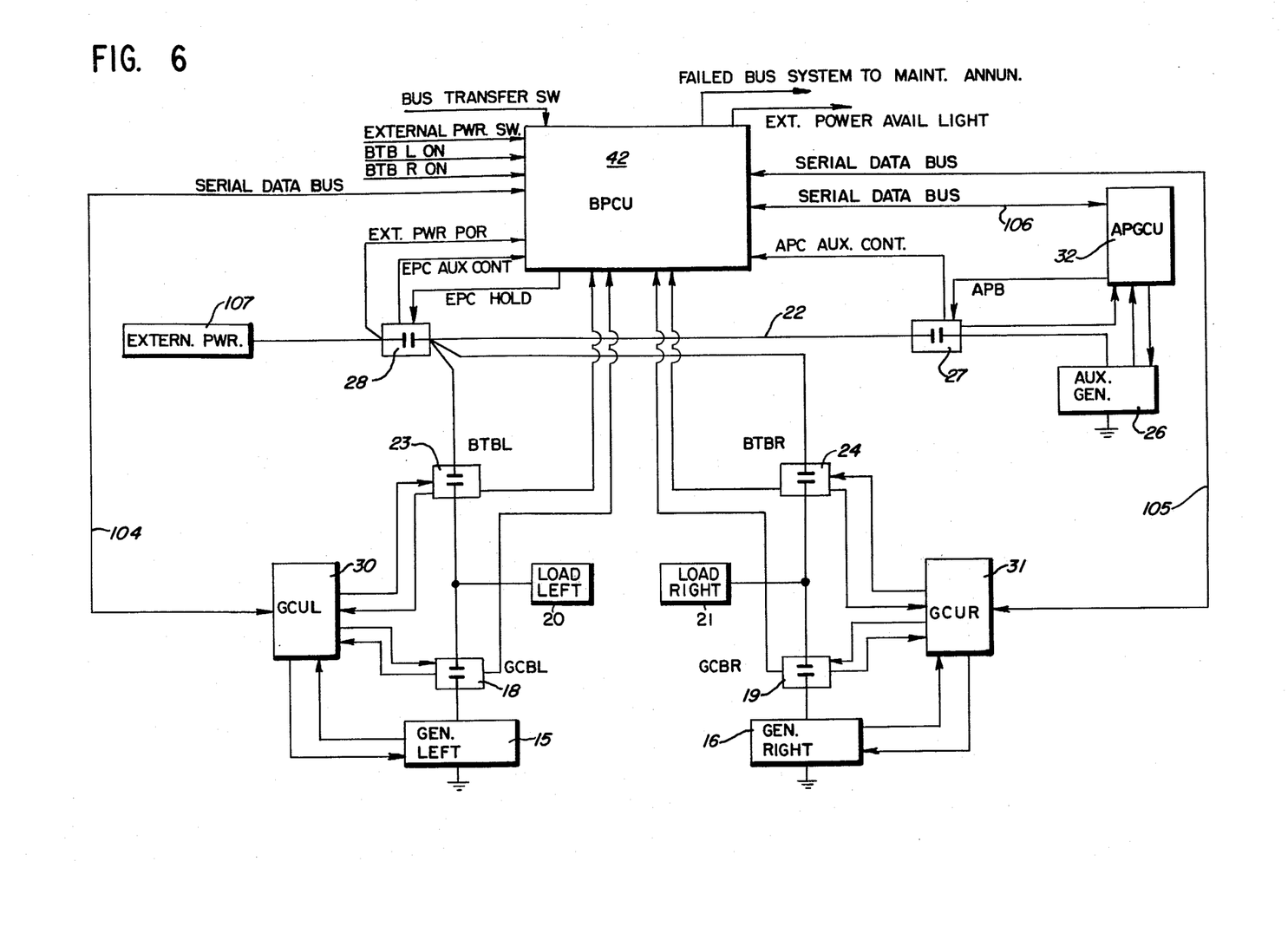
FIG. 6 is a system block diagram similar to FIG. 1, showing additional detail of the bus power control unit and its interconnection with the distribution system.

The relationship of the bus power control unit 42 to the system, including the data interconnection with the generator control units 30, 31, and inputs from the generator circuit breakers 18, 19 and bus tie breakers 23, 24 are illustrated in FIG. 6. More specifically, considering left generator 15, an auxiliary contact of the generator circuit breaker 18 provides an input to BPCU 42. Another auxiliary contact provides an input to GCUL 30 and the breaker is controlled by the generator control unit, as described above. The bus tie breaker 23 has an auxiliary contacts which provide inputs to GCUL 30 and BPCU 42 and the tie breaker is operated by the GCUL in accordance with information developed in GCUL and information received from BPCU. Similar circuits are provided for the generator circuit breaker 19 and bus tie breaker 24 for right generator 16. Both generator control units 30 and 31 are connected through data buses 104 and 105 respectively with the bus power control unit.

Signals representing the condition of the auxiliary contacts which are connected with the generator and bus power control units provide redundant information which is checked for accuracy by the control units through communication over the data links. Voltage and current measurements add further levels of redundant information.

Auxiliary generator 26 is connected with the tie bus 22 through auxiliary power breaker 27 which has an auxiliary contacts providing inputs to BPCU 42 and APGCU 32. The auxiliary power breaker 27 is operated by an output of APGCU 32. Serial data bus 106 provides for communication between the auxiliary power generator control unit 32 and the bus power control unit 42.

A source of external power indicated at 107 may be provided when the aircraft is on the ground. This power source is connected through external power contactor 28 (EPC) with bus 22. An auxiliary contact on the external power contactor provides an input to BPCU 42 and the control unit in turn operates the external power contactor. Phase voltages of the external power provide an additional input to the bus power control unit.

Other inputs for the bus power control unit include cockpit controls representing a bus transfer switch, an external power switch and bus tie breaker switches. Outputs in addition to information transmitted to the GCUs over the data buses and control of external power contactor 28, include cockpit signals indicating a bus system failure and the availability of external power. Other cockpit outputs may, if desired, be provided.

When the aircraft is on the ground, electrical power is normally provided from external power source 107 or from the auxiliary generator 26. With external power, external power contactor 28 and the bus tie breakers 23, 24 are closed, connecting power to the loads 20, 21, FIG. 1. With the auxiliary generator 26, auxiliary power breaker 27 and bus tie breakers 23, 24 are closed.

When the aircraft engines are started in preparation for takeoff, generators 15 and 16 are available to supply power after the appropriate engine speed is achieved. At this time the electrical loads are transferred from the external power source or the auxiliary generator to the engine driven generators by opening bus tie breakers 23, 24 and closing generator circuit breakers 18. In the event of an engine or generator failure in flight, all loads may be operated from one of the engine driven generators or from a combination of one engine driven generator and auxiliary generator 26 by appropriate manipulation of the bus tie breakers and generator circuit breakers.

Figure 7:
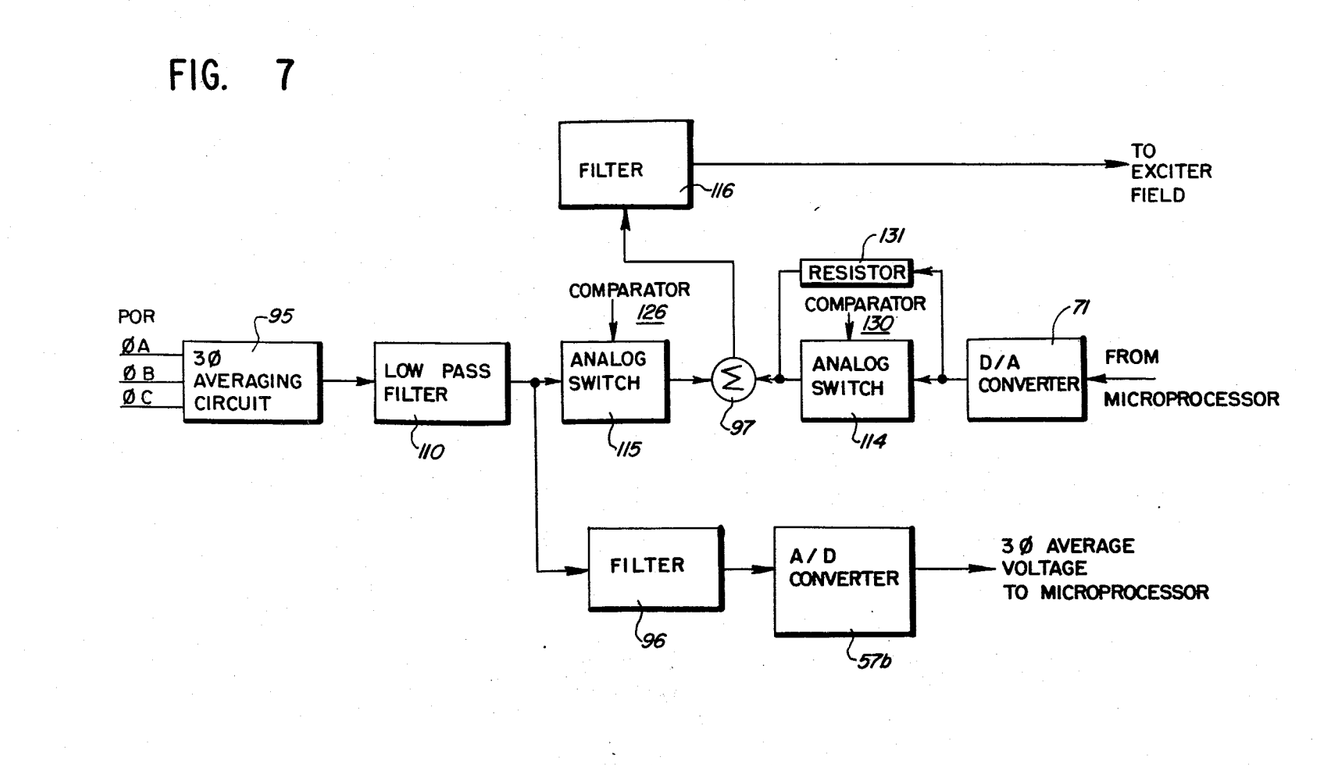
FIG. 7 is a block diagram of the generator voltage regulator.
Figure 8:
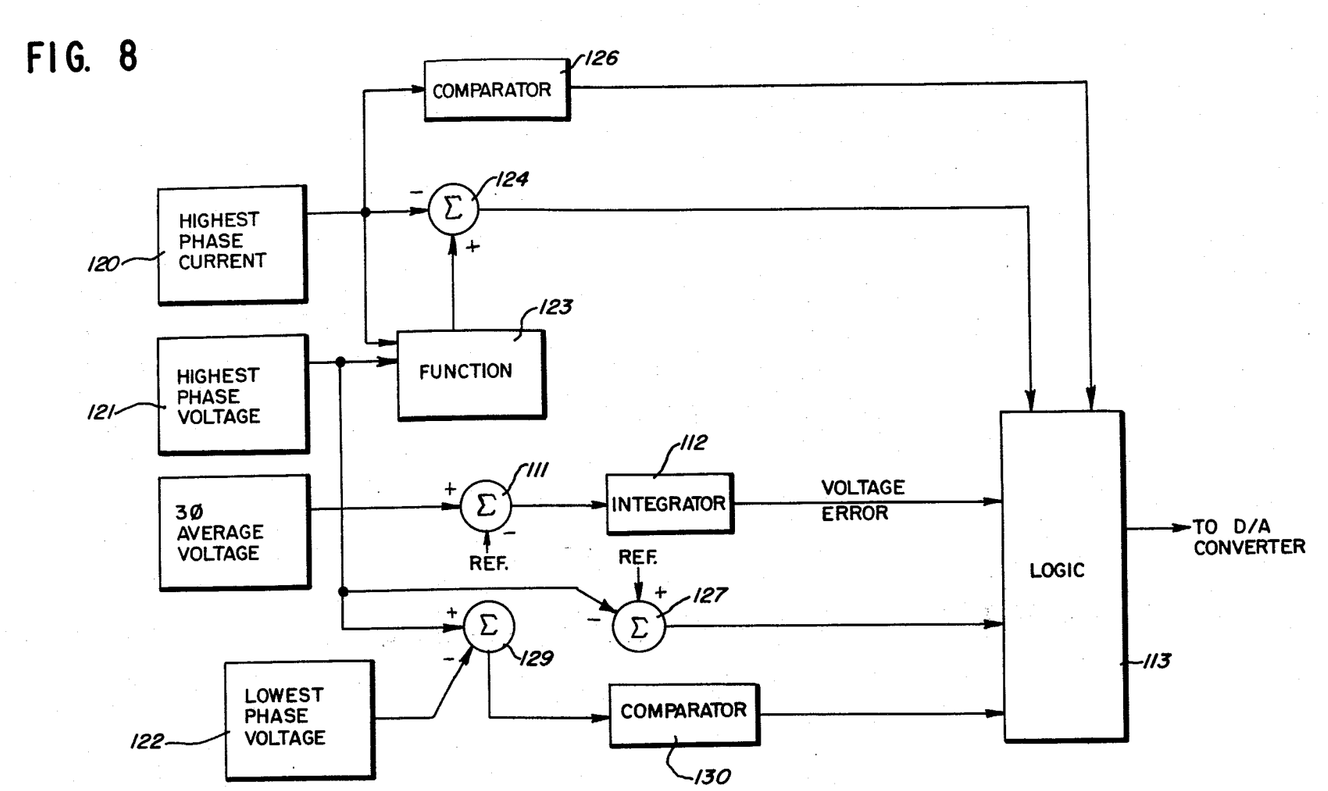
FIG. 8 is a block diagram illustrating the microprocessor functions related to the voltage regulator.

FIGS. 7 and 8 illustrate in more detail the combination of analog and microprocessor signal handling in the voltage regulator. Referring first to FIG. 7, the three phase voltages φA, φB and φC are connected with averaging circuit 95 and the analog average signal is connected through a low pass filter 110, filter 96 and analog to digital converter 57b to the microprocessor. FIG. 8 illustrates in functional block form the voltage regulator related signal paths in the microprocessor. For normal generator regulation, the three phase average voltage is compared with a reference at summing junction 111. The difference is integrated at 112 providing a voltage error connected through logic circuit 113, digital to analog converter 71 and analog switch 114 to an input of summing junction 97. The average phase voltage from filter 110 is connected through analog switch 115 with another input of summing junction 97. The output of summing junction 97 is connected through a filter 116 with the pulse width modulator 98 and output amplifier 99 of FIG. 5 to provide a regulated current to the exciter field.

The microprocessor has additional inputs representing the highest phase current 120, highest phase voltage 121 and lowest phase voltage 122. These afford additional modes of operation of the voltage regulator to accommodate abnormal conditions. The high phase current and a function of the highest phase voltage, established by function block 123, are summed at junction 124 providing a field winding current limit of the character described in Dhyanchand et al U.S. Pat. No. 4,044,296. Reference may be had to this patent for a further description of the nature of the field current limits.

In the event of a single phase fault in the generator, the average phase signal from filter 110 includes harmonics which should not be coupled to the exciter field current control. This condition also results in a high phase current detected by comparator 126 which provides a mode control signal to open analog switch 115. This removes the average voltage input from summer 97. The system continues to function with the voltage error from summer 124 controlling the field current.

In the event one phase voltage is low, the regulator will try to establish an excessive field current. This condition is reduced by comparing the highest phase voltage with a reference at summing function 127 providing a signal to logic circuit 113 and limiting the control signal to the exciter field.

The highest phase voltage and lowest phase voltage are compared at summing junction 129. When the difference is excessive, comparator 130 has an output which opens analog switch 114 reducing the gain for the voltage error signal by connecting resistor 131 in the circuit. This prevents the regulator from attempting to establish an excessive field current.

The microprocessor based generator and bus power control units correlate more complete and more accurate information concerning generator and distribution system conditions than is practical with a hard wired control. The microprocessors also have a greater logic capability than is practical with hard wired circuits. As a result, the electrical system is operated with less breaker cycling and fewer service interruptions than have been achieved with prior controls.

We claim:

1. In an electrical generation and distribution system having at least two generators (15, 16) each having an output circuit and having for at least one of the generators a load circuit (20) and a generator circuit breaker (18) connecting the load circuit with the generator, an electrical bus (22) and a bus tie breaker (26) connecting the load circuit through said bus with the other of such generator, an improved control, comprising:

a microprocessor generator control unit (30, 31) for each of said generators, said generator control units having inputs and outputs;

a microprocessor bus power control unit (42) having inputs and outputs;

means connecting the output circuit of each of said generators with inputs of the generator control unit associated therewith for the generator control unit to respond to generator conditions;

means connecting outputs of said generator control units with said generator to establish operation thereof;

means connecting inputs of said bus power control unit with the electrical distribution system for the bus power control unit to respond to distribution system conditions;

serial data links (104, 105, 106) interconnecting said bus power control unit (42) with each of said generator control units (30, 31) to transmit generator and distribution system condition information and control unit outputs among the control units to correlate operation of the control units; and means connecting the generator circuit and bus tie breakers (18, 26) to respond to the outputs circuit and bus tie breakers (18, 26) to respond to the outputs of said control units (30, 31, 42) to connect the load circuit with one of said generators.

2. The control of claim 1 in which the output of said bus power control unit operates said bus tie breaker.

3. The control of claim 1 in which the output of said generator control unit operates the generator circuit breaker.

4. The control of claim 1 including means responsive to the state of the circuit and tie breakers to provide inputs to said bus power control unit.

5. A control of claim 5 including means responsive to the state of said circuit breaker to provide inputs to the generator control unit for said one generator and to the bus power control unit.

6. In an electrical generating and distribution system having a first generator (15) having an output circuit, a first load circuit (20) and a first generator circuit breaker (18) connecting the first load circuit with the first generator, a second generator (16) having an output circuit, a second load circuit (21) and a second generator circuit breaker (19) connecting the second load circuit with the second generator, an auxiliary generator (26) having an output circuit, an electrical tie bus (22) interconnecting the first and second load circuits (20, 21) and the auxiliary generator (26) through first, second and auxiliary tie breakers (23, 24, 27) respectively, an improved control comprising:

- a first microprocessor generator control unit (30) for the first generator;
- a second microprocessor generator control unit (31) for said second generator;
- a third microprocessor generator control unit (32) for said auxiliary generator each of said generator control units having inputs and outputs;
- a microprocessor bus power control unit (42) having inputs and outputs;
- means connecting inputs of each of said generator control units with the output circuit of the corresponding generator to respond to generator conditions;
- means connecting outputs of each of said generator control units with the respective generator to control the operation thereof;
- means connecting the inputs of said bus power control unit with the electrical distribution system for the bus power control unit to respond to distribution system conditions;
- a serial data link (104, 105, 106) between said bus power control unit (42) and each of said generator control units (30, 31, 32) to transmit generator and distribution system condition information and control unit outputs among the control units to correlate operation of the control units; and
- means connecting the generator circuit and bus tie breakers (18, 19, 23, 24, 27) to respond to outputs of the control units (30, 31, 32, 42) to connect each load (20, 21) with one of the generators (15, 16, 26).

7. The control of claim 6 in which the output of the bus power control unit operates the bus tie breakers.

8. The control of claim 6 for a system having an external power source connected with the electrical tie bus through an external power contactor and in which said bus power control unit operates said external power contactor.

9. In an electrical generating and distribution system having a first generator (15), a first load circuit (20) and a first generator circuit breaker (18) connecting the first load circuit with the first generator, a second generator (16), a second load circuit (21) and a second generator circuit breaker (19) connecting the second load circuit with the second generator, an auxiliary generator (26), an electrical tie bus (22) interconnecting the first and second load circuits and the auxiliary generator through first, second and auxiliary tie breakers (23, 24, 27), a microprocessor generator control unit (30, 31, 32) for each generator and a microprocessor bus power control unit (42), having a control method with the steps of, operating each of said generator control units in accordance with conditions of the associated generator to control the generator operation, and operating said bus power control unit in accordance with electrical distribution circuit conditions, the improvement which comprises:

communicating generator and distribution circuit condition and control information between the generator control units and the bus power control unit to control said circuit and tie breakers to deliver power from one of said generators to each of said loads.

* * * * *